(12) United States Patent
Bruno et al.

(10) Patent No.: US 8,902,426 B2
(45) Date of Patent: Dec. 2, 2014

(54) CONTROL OF LIGHT-EMITTING DIODES AND SENSORS

(71) Applicant: Hewlett-Packard Development Company, L.P., Houston, TX (US)

(72) Inventors: Javier Gonzalez Bruno, Terrassa (ES); Marti Rius Rossell, Sant Cugat del Valles (ES); Jordi Ferran Cases, Santa Maria de Palautordera (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/755,181

(22) Filed: Jan. 31, 2013

(65) Prior Publication Data

US 2014/0210891 A1    Jul. 31, 2014

(51) Int. Cl.
| | |
|---|---|
| *G01N 21/25* | (2006.01) |
| *G03G 15/00* | (2006.01) |
| *B41J 29/38* | (2006.01) |
| *G01J 1/02* | (2006.01) |
| *G01J 3/46* | (2006.01) |
| *G01J 3/50* | (2006.01) |
| *B41J 2/125* | (2006.01) |

(52) U.S. Cl.
CPC .. *G01J 3/501* (2013.01); *G01J 1/02* (2013.01); *B41J 2/125* (2013.01); *G01J 3/46* (2013.01)
USPC .................................. 356/419; 399/75; 347/5

(58) Field of Classification Search
USPC ............................................................ 399/74
See application file for complete search history.

(56) References Cited

U.S. PATENT DOCUMENTS

| | | | |
|---|---|---|---|
| 5,844,680 A | 12/1998 | Sperling | |
| 6,495,964 B1 | 12/2002 | Muthu et al. | |
| 7,646,974 B2 | 1/2010 | Wernersson | |
| 2003/0086090 A1* | 5/2003 | Tandon et al. ................ | 356/419 |
| 2007/0097159 A1* | 5/2007 | Bastani ........................... | 347/5 |
| 2009/0256797 A1 | 10/2009 | Declercq et al. | |
| 2011/0057571 A1 | 3/2011 | Ackermann et al. | |

OTHER PUBLICATIONS

U.S. Dept of Energy. Budding Technologies Program. Solid-State Lighting Technology Fact Sheet. PNNL-SA-84900. Jan. 2012.

* cited by examiner

*Primary Examiner* — Stephen Meier
*Assistant Examiner* — Renee I Wilson

(57) ABSTRACT

A densitometer includes a plurality of light-emitting diodes (LEDs) and at least one sensor. The LEDs are activated one at a time in a sequential, repeatable order. Photonic energy from each LED is reflected off an entity and is incident upon the sensor(s). Circuitry samples or acquires signaling from the sensor(s) in accordance with the respective LED activations. Signaling from the densitometer can be used in controlling ink-jetting printers or other apparatus.

19 Claims, 4 Drawing Sheets

CONTROL OF LIGHT-EMITTING DIODES AND SENSORS

BACKGROUND

Ink-jetting printers form images on media using liquid ink. In some cases, inks are applied in an overlapping fashion in the interest of texture, color saturation, opacity or other characteristics. Correct overlapping alignment of separately applied inks is germane to achieving the desired results. The present teachings address the foregoing and related concerns.

BRIEF DESCRIPTION OF THE DRAWINGS

The present embodiments will now be described, by way of example, with reference to the accompanying drawings, in which.

DETAILED DESCRIPTION

Introduction

A densitometer includes a plurality of light-emitting diodes (LEDs) and at least one sensor. The LEDs emit respectively different spectra of photonic energy. The LEDs are activated one at a time in a repeatable, sequential order. Photonic energy from each LED is reflected off an entity and is incident upon the sensor(s). Circuitry samples (or acquires) signaling from the sensor or sensors in accordance with the respective LED activations. Signaling from the densitometer can be used in controlling ink-jetting printers or other apparatus.

In one example, an apparatus includes a plurality of light-emitting diodes (LEDs). The apparatus also includes a sensor to detect photonic energy emitted from a presently activated one of the LEDs and reflected from a proximate surface. The sensor is configured to provide signaling corresponding to the detection. The apparatus also includes circuitry to activate the sensor, and to activate the LEDs one at time in a sequential order. The circuitry is configured to sample signaling from the sensor during the respective activations of the LEDs.

In another example, a method is performed using electronic circuitry, the method including activating a sensor. The method also includes activating a plurality of light-emitting diodes (LEDs) one at a time in a repeating sequence. The method further includes detecting photonic energy emitted from each of the LEDs and reflected from a proximate surface using the sensor. The method also includes sampling a signal from the sensor in accordance with the activation of each of the LEDs. Each signal sample corresponds to a luminance value.

In still another example, a printing system includes a controller, and a print engine to form images on sheet media by way of ink-jetting. The print engine is controlled by the controller. The printing system also includes an apparatus having plural different light-emitting diodes (LEDs) and a sensor. The apparatus is configured to activate the LEDs one at a time in an order. The apparatus is also configured to provide signals in accordance with photonic energy originating from each LED and reflected from a printed sheet of the media onto the sensor. The controller is also configured to control the print engine in accordance with the signals.

Illustrative Arrangement

Figure 1:
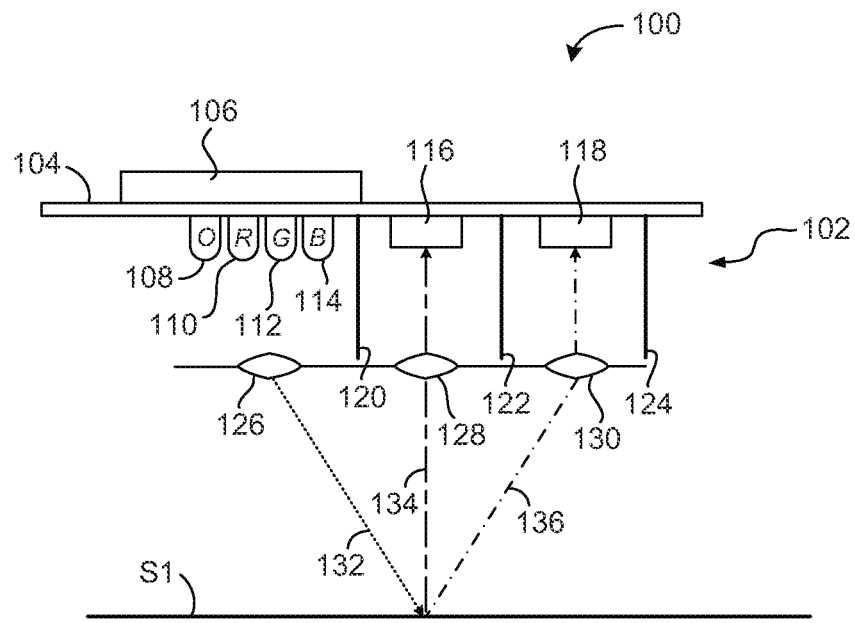
FIG. 1 depicts a diagram of a densitometer according to one example of the present teachings.

Attention is directed now to FIG. 1, which depicts an arrangement 100 including a densitometer 102 in accordance with the present teachings. The arrangement 100 is illustrative and non-limiting with respect to the present teachings. Other arrangements, elements, configurations or operations can also be used.

The densitometer 102 includes a circuit board 104 supporting electronic circuitry 106. The circuitry 106, also referred to as control circuitry or a controller 106, is configured to control or coordinate normal operations of the densitometer, acquire (sample) and process signals, and to provide signals or data to another entity or entities. The circuitry 106 can be variously defined and can include, without limitation, a processor, a state machine, analog or digital or hybrid circuitry, one or more integrated circuits, and so on. In one example, the circuitry 106 is at least partially embodied by an application-specific integrated circuit (ASIC). Other constituency can also be used. The circuitry 106 operates in accordance with the present teachings, as described hereinafter.

The densitometer 102 also includes four respective light-emitting diodes (LEDs) 108, 110, 112 and 114. Each of the LEDs 108-114 is individually controllable by the circuitry 106 and is configured to emit light having a particular spectral content. In one example, each of the LEDs 108-114 emits photonic energy of a color distinct from that of all the others. As depicted, the LED 108 emits light within an orange region of the visual spectrum (i.e., orange color), the LED 110 emits light of a red color, the LED 112 emits light of a green color, and the LED 114 emits light of a blue color. Other colors, LED counts or color combinations can also be used, as can LEDs emitting light in the infrared or ultraviolet regions of the spectrum.

The densitometer 102 also includes a first sensor 116 and a second sensor 118. Each of the sensors 116 and 118 is configured to detect (sense) incident photonic energy and to provide an electrical signal (signaling) corresponding to detected luminance to the circuitry 106. In one example, at least the sensor 116 or the sensor 118 is defined by a phototransistor. In another example, at least the sensor 116 or the sensor 118 is defined by a photodiode. Other suitable devices can also be used. Each sensor 116 and 118 receives operating electrical power (e.g., biasing) from the circuitry 106, as well.

The densitometer 102 also includes respective baffles 120, 122 and 124. The baffles 120-124 prevent stray or ambient light rays, and direct emissions from the LEDs 108-114, from being incident upon the sensors 116 and 118. Thus, the sensors 116 and 118 are situated to receive only (or nearly so) photonic emissions sourced from the LEDs 108-114 that are reflected from a surface "S1" proximate to the densitometer 102.

The densitometer 102 further includes respective optical elements 126, 128 and 130. Each of the optical elements can be variously defined by, for non-limiting example, a lens, a corner lens, a prism, a Fresnel lens, and so on. The optical element 126 is disposed and characterized so as to direct light energy 132 from the LEDs 108-114 toward a surface S1 proximate the densitometer 102. In turn, the optical elements 128 and 130 are disposed and characterized so as to direct (focus, or collimate) reflected light energies 134 and 136 onto the sensors 116 and 118, respectively.

The arrangement 100 also includes a surface S1 as introduced above. The surface S1 is proximate to the densitometer 102 such that photonic emissions 132 from a selected one of the LEDs 108-114 is incident thereon, and reflected photonic energies 134 and 136 are incident upon the sensor 116 and 118, respectively. In one example, the surface S1 is defined by a sheet media (e.g., paper) having images formed thereon in ink media. Typically, but not necessarily, such images are defined by two or more colors of ink deposited in an overlapping or "registered" orientation. Other surfaces S1 can also be used.

Generally, the densitometer 102 is configured to emit photonic energy (132) of a selected color (by way of the LEDs 108-114) toward a printed media (S1), and to detect and quantify (measure) the luminance of a reflected portion (134 or 136) of that emission. Signaling corresponding to the detected luminance can then be provided to a printer controller or other suitable entity. Such signaling can include information encoded as electronic signals, formatted as digital data, analog signals within a predefined range, and so on.

Representative Block Diagram

Figure 2:
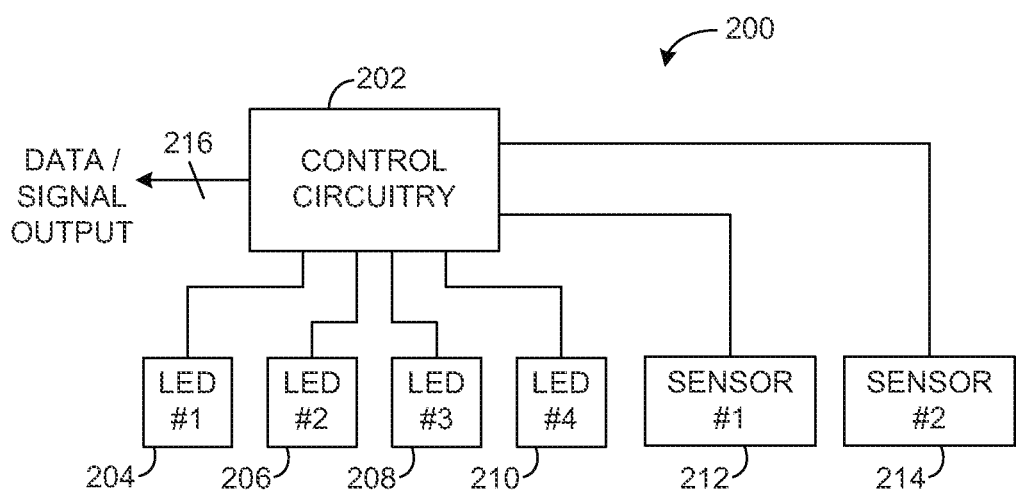
FIG. 2 depicts a block diagram of elements of a densitometer according to another examples of the present teachings.

Reference is made to FIG. 2, which depicts a densitometer 200 presented in block diagrammatic form in the interest of clarity. The densitometer 200 includes control circuitry 202 to control normal operations of the densitometer 200. Respective, color-distinct LEDs 204, 206, 208 and 210 are coupled in controlled relationship with the control circuitry 202. Two respective sensors 212 and 214 are coupled to provide signaling to the control circuitry 202 in response to detected photonic energy incident thereon.

The control circuitry 202 is configured to provide an output signal (or data) 216 to a printer controller or other entity correspondent to the detected light signals provided by the sensor 212 or sensor 216. In one example, the densitometer 200 is analogous to at least a portion of the densitometer 102. Thus, the densitometer is 200 is configured to provide electronic signaling within an ink-jetting printing system so that proper application, registration, saturation and so on of ink media can be verified or controlled.

Illustrative Method

Figure 3:
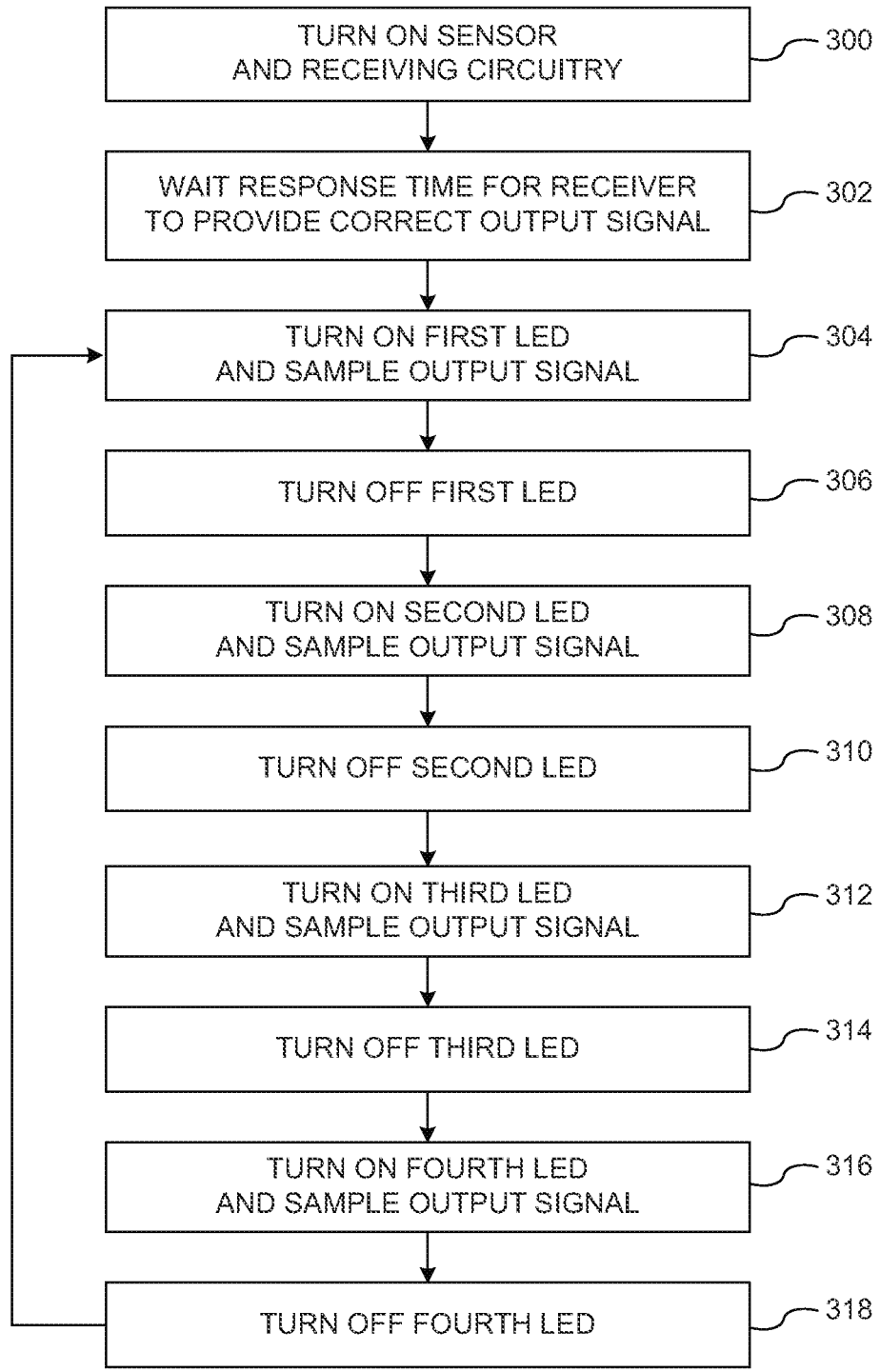
FIG. 3 depicts a flow diagram of method steps according to another example of the present teachings.

Attention is now turned to FIG. 3, which depicts a flow diagram of a method according to the present teachings. The method of FIG. 3 includes particular steps performed in a particular order of execution. However, other methods including other steps, omitting one or more of the depicted steps, or proceeding in other orders of execution can also be defined and used. Thus, the method of FIG. 3 is illustrative and non-limiting with respect to the present teachings. Reference is also made to FIG. 1 in the interest of illustrating the method of FIG. 3.

At 300, a sensor and receiving circuitry are turned on. For purposes of a present example, electrical energy is provided to a control circuit 106 of a densitometer 102, which in turn provides electrical energy (or biasing) to a sensor 116. Thus, signal receiving circuitry within the control circuit 106 and the 116 are activated.

At 302, a wait for a response time is performed for provision of an accurate detection signal. In the present example, the control circuit 106 waits a predetermined period of time. The wait (dwell, or delay) period allows the sensor 116 and relevant portions of the control circuit 106 to sufficiently stabilize such that signaling from the sensor 116 can be sampled (or acquired) and processed with accuracy within a predetermine tolerance. In one non-limiting example, the wait time is about three-hundred microseconds (i.e., $3.0 \times 10^{-4}$ seconds). Other suitable wait times can also be used. In another example, the wait time of step 302 is essentially omitted.

At 304, a first LED is turned on and the detection signal is sampled. In the present example, the orange LED 108 is activated (turned on) and the control circuitry 106 samples (acquires, or digitally quantifies) the signaling provided by the sensor 116. The sampled signal corresponds to a detected luminance value as sourced by the LED 108 and reflected back to the sensor 116 from the surface S1. The sampled signal or value can be loaded into a processor register, stored as a value in a sample-and-hold circuit, or held in another suitable way.

At 306, the first LED is turned off. In the present example, the control circuit 106 ceases provision of energy (or biasing) to the orange LED 108. The LED 108 is thus deactivated. However, the sensor 116 remains energized and ready to sense other photonic energy.

At 308, a second LED is turned on and the detection signal is sampled. In the present example, the red LED 110 is activated and the control circuitry 106 samples the signaling provided by the sensor 116. The sampled signal corresponds to a detected reflected luminance, and the sampled signal or value can be loaded into a register, stored as a value, or held in another suitable way.

At 310, the second LED is turned off. In the present example, the control circuit 106 ceases provision of energy (or biasing) to the red LED 110. The LED 110 is thus deactivated. The sensor 116 remains energized.

At 312, a third LED is turned on and the detection signal is sampled. In the present example, the green LED 112 is activated and the control circuitry 106 samples the signaling provided by the sensor 116. The sampled signal is loaded, stored or held in some suitable way.

At 314, the third LED is turned off. In the present example, the control circuit 106 ceases provision of energy (or biasing) to the green LED 112. The sensor 116 remains energized.

At 316, a fourth LED is turned on and the detection signal is sampled. In the present example, the blue LED 114 is activated and the control circuitry 106 samples the signaling provided by the sensor 116. The sampled signal is loaded, stored or held in some suitable way.

At 318, the fourth LED is turned off. In the present example, the control circuit 106 ceases provision of energy (or biasing) to the blue LED 114. The LED 114 is thus deactivated, and the sensor 116 remains energized. A single iteration of the method is now complete, and the method can now return to step 304 above to begin another iteration.

Illustrative Signal Timing

Figure 4:
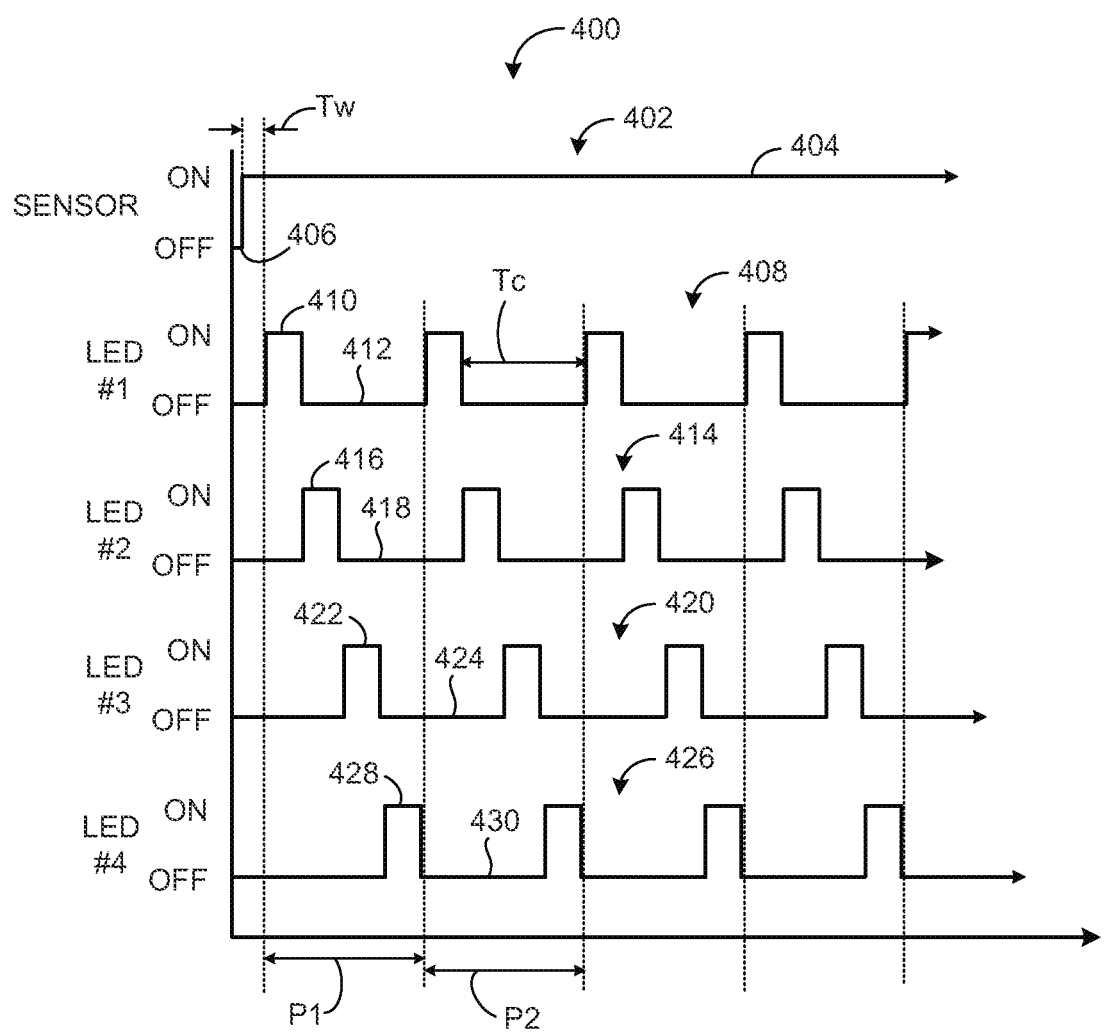
FIG. 4 depicts a signal timing diagram in accordance with densitometer operations according to the present teachings.

Reference is made now to FIG. 4, which depicts a signal timing diagram (diagram) 400 in accordance with another example of the present teachings. The diagram 400 is illustrative and non-limiting, and signals having other characteristics or timing relationships can also be used.

The diagram 400 includes a sensor signal 402 corresponding to the activated/deactivated status of a sensor (e.g. 116 or 118) with respect to time. The sensor signal 402 is defined by two modes of operation: on (active) as depicted at 404, and off (inactive) as depicted at 406. A sensor, such as 116 or 118, is energized or biased during the on phase 404, and de-energized or non-biased during the off phase 406.

The diagram 400 also includes a first LED signal 408 corresponding to the activated/deactivated status of a first LED (e.g., orange LED 108) with respect to time. The LED signal 408 is defined by on phases as depicted at 410, and off phases as depicted at 412. The corresponding LED is emitting photonic energy (and is self-heating) during on times, and is not emitting photonic energy (and is cooling toward ambient temperature) during off times. As depicted, the LED signal 408 is not activated until an initial warm-up time "Tw" has expired. The time period "Tw" permits the corresponding sensor (e.g., 116 or 118) and signal receiving circuitry (e.g., 106) to stabilize and acquire luminance level signaling accurate to within a predetermined tolerance.

The sensor signal 402 is on continuously after an initial energization, and remains on thereafter during on times 410 and off times 412 of the LED signal 408. Each off time (or phase) 412 is characterized by a time period "Tc" during which the LED (e.g., 108) is cooling to (or toward) ambient temperature. The first LED signal 408 is not on during the on period of any other LED.

The diagram 400 also includes a second LED signal 414 corresponding to the activated/deactivated status of a second LED (e.g., red LED 110) with respect to time. The LED signal 414 is defined by on phases 416 and off phases 418. The corresponding LED emits photonic energy during on times 416, and does not emit photonic energy during off times 418. The sensor signal 402 is on continuously during on times 416 and off times 418 of the LED signal 414. The second LED signal 414 is on after the first LED signal 408 has been turned off, and is not on during the activation of any other LED.

The diagram 400 also includes a third LED signal 420 corresponding to the activated/deactivated status of a third LED (e.g., green LED 112) with respect to time. The LED signal 420 is defined by on phases 422 and off phases 424. The corresponding LED emits photonic energy during on times 422, and does not emit photonic energy during off times 424. The sensor signal 402 is on continuously during the on times 422 and off times 424. The third LED signal 420 is activated after the second LED signal 414 has been turned off, and is not activated during the activation of any other LED.

The diagram 400 further includes a fourth LED signal 426 corresponding to the activated/deactivated status of a fourth LED (e.g., blue LED 114) with respect to time. The LED signal 426 is defined by on phases 428 and off phases 430. The corresponding LED emits photonic energy during on times 428, and does not emit photonic energy during off times 430. The sensor signal 402 is on continuously during the on times 428 and off times 430. The fourth LED signal 426 is on after the third LED signal 420 has been turned off, and is not activated during the activation of any other LED.

The diagram 400 also depicts respective time periods "P1" and "P2". The time period "P1" corresponds to a complete sensing or "scan" of all four LEDs of an illustrative densitometer (e.g., 102). In turn, the time period "P2" corresponds to another complete sensing subsequent to the first. Thus, the diagram 400 depicts signaling corresponding to respective LEDs that are activated one at a time in a sequential order, while the emissions from each are reflected from a target surface (e.g., "S1") and detected. The diagram 400 depicts signaling correspondent to one operating sequence contemplated by the present teachings. Any number of other operating sequences and their respective signaling can also be defined and used.

It is important to note that the LEDs are activated one at a time so that a relatively narrow spectrum of photonic energy is reflected from a target object (e.g., a sheet of imaged media) and detected by a sensor (or sensors). Densitometer readings, each cycling through a plurality of LEDs, can be acquired and processed in a relatively rapid manner.

Illustrative Printing Apparatus

Figure 5:
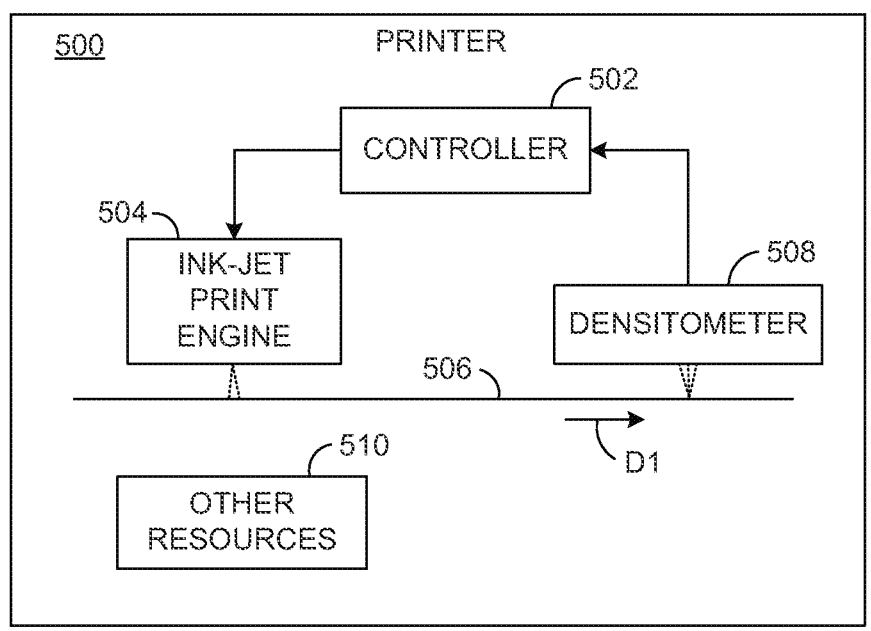
FIG. 5 depicts an ink-jetting printer including a densitometer in accordance with an example of the present teachings.

Reference is made now to FIG. 5, which depicts a block diagram of a printer 500 in accordance with the present teachings. The printer 500 is illustrative and non-limiting, and other printers of respectively varying constituency or other characteristics can also be defined and used in accordance with the present teachings.

The printer 500 includes a controller 502 to control various normal operations of the printer 500. The controller 502 can be variously defined and can include, without limitation, a microprocessor, a microcontroller, a state machine, digital or analog or hybrid circuitry, and so on. In one example, the controller 502 is defined by a processor configured to operate according to a machine-readable program code.

The printer 500 also includes an ink-jetting print engine 504. The print engine 504 is configured to form images on sheet media 506 by way of controlled jetting (emission, or dropping) of one or more colors of liquid ink. Such imaging can include photographic images, text, indicia, technical graphics, and so on. The print engine 504 operates in accordance with control signaling from the controller 502.

The printer 500 also includes a densitometer 508 in accordance with the present teachings. The densitometer 508 is configured to sense and measure (quantify) one or more characteristics of images formed on the sheet media 506 by way of reflected photonic energy in one or more regions of the spectrum (colors). The densitometer 508 provides signaling to the controller 502 in accordance with the sensed/measured characteristics. In one example, the densitometer 508 is equivalent or analogous to the densitometer 102. Other densitometers in accordance with the present teachings can also be used.

Thus, the densitometer 508 includes (at least): one or more LEDs of various respective emission colors; one or more sensors to detect reflected photonic energy; and control circuitry to activate the LEDs one at a time in sequence and to acquire luminance level signals from the one or more sensors. The densitometer 508 can also include other features or characteristics, as well.

The printer 500 further includes other resources 510. Such other resources 510 can include any suitable or desirable elements, subsystems or other entities, coupled to each other accordingly. Non-limiting examples of other resources 510 include a power supply, a user interface, a display screen, indicator lights, wireless or network communications circuitry, memory or other tangible data storage, and so on. Other resources can also be used.

Normal, typical operations of the printer 500 proceed generally as follows: The controller 502 provides electronic signaling to the print engine 504 in accordance with a document to be imaged (printed) on sheet media 506. The print engine 504 responds by forming corresponding images in one or more ink media on the sheet media 506. The sheet media 506 is transported past the print engine 504 as depicted by the directional arrow "D1".

The sheet media 506, having just-formed ink imaging thereon, comes into view (or cooperative proximity) of the densitometer 508. The densitometer sequentially activates one or more different color-emitting LEDs such that corresponding light emission are reflected off of the ink imaging on the sheet media 506. The reflected emissions are detected by a sensor (or sensors) of the densitometer 508 and corresponding signaling is provided to the controller 502.

The controller 502 can make adjustments to one or more aspects of the printing operation in accordance with the signaling, and provide corresponding control signals to the print engine 504. Non-limiting examples of printing aspects that can be detected and/or adjusted include color saturation, overlapping-ink registration, color hue, and so on. Thus, the controller 502, print engine 504 and densitometer 508 define a closed-loop control system within the printer 500.

In general, the present teachings contemplate systems, electronic circuits, devices and methods for controlling the operation of LEDs and one or more sensors within a densitometer. A sensor is activated, and one or more LEDs are activated, one at a time, in a predetermined order. Control electronics of the densitometer can optionally wait (or dwell) for a predetermined period of time so that a luminance-related signal from the sensor(s) can be sampled with accuracy within a predetermined tolerance (e.g., 1%). Such a wait time is referred to as a "response time" or "warm-up time" for purposes herein.

The sensor signaling is then discretely sampled (or acquired) providing a digitally quantified or analog value corresponding to a detected luminance value for each LED in the activation sequence. The just-sampled signals can be processed or otherwise formatted for transmission to another entity distinct from the densitometer such as, for example, a main or master controller of a printing apparatus. Other operations of such a densitometer, or uses for the corresponding signals, can also be performed.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus, comprising:
    a plurality of light-emitting diodes (LEDs);
    a sensor to detect photonic energy emitted from a presently activated one of the LEDs and reflected from a proximate surface, the sensor to provide signaling corresponding to the detection; and
    circuitry to activate the sensor, the circuitry to activate the LEDs one at time in a sequential order, the circuitry to sample signaling from the sensor during the respective activations of the LEDs,
    in which the circuitry to activate the sensor comprises circuitry to wait for a predetermined period of time to stabilize a signal before sampling from the sensor.

2. The apparatus according to claim 1, the circuitry to provide an output signal corresponding to the sampled signaling.

3. The apparatus according to claim 1, the plurality of LEDs including at least two LEDs of respectively different colors of emission.

4. The apparatus according to claim 1, the plurality of LEDs including at least a red emitting LED and an orange emitting LED and a green emitting LED and a blue emitting LED.

5. The apparatus according to claim 1 further comprising a baffle wall separating the LEDs from the sensor.

6. The apparatus according to claim 1 further comprising an optical element to direct photonic energy from an activated one of the LEDs toward a proximate surface.

7. The apparatus according to claim 1, the circuitry to repeat the activation sequence of the LEDs in an ongoing manner.

8. The apparatus according to claim 1, the sensor defined by a first sensor, the apparatus including a second sensor disposed apart from the first sensor, the second sensor to provide signaling corresponding to detected photonic energy emitted from a presently activated one of the LEDs reflected from a proximate surface.

9. The apparatus according to claim 1, the apparatus such that the proximate surface is a sheet of media having images formed in ink thereon.

10. The apparatus according to claim 1, in which the circuitry waits the predetermined period of time before activating a first one of the LEDs in the sequential order and in which the apparatus further comprises a receiving portion of the circuitry so as to sample the signaling accurate within a tolerance.

11. A method performed using electronic circuitry, the method comprising:
    activating a sensor;
    activating a plurality of light-emitting diodes (LEDs) one at a time in a repeating sequence;
    detecting photonic energy emitted from each of the LEDs and reflected from a proximate surface using the sensor; and
    sampling a signal from the sensor in accordance with the activation of each of the LEDs, each signal sample corresponding to a luminance value,
    in which activating the sensor comprises waiting for a predetermined period of time to stabilize a signal before sampling from the sensor and before activating a first one of the LEDs in the sequential order.

12. The method according to claim 11 further comprising providing an output signal from electronic circuitry corresponding to the signal samples.

13. The method according to claim 11 further comprising:
    passing a sheet of printed media proximate to the LEDs and the sensor; and
    detecting photonic energy emitted from each of the LEDs and reflected from the sheet of printed media using the sensor.

14. The method according to claim 11, the plurality of LEDs including a red emitter and an orange emitter and a green emitter and a blue emitter.

15. A printing system, comprising:
    a controller;
    a print engine to form images on sheet media by way of ink-jetting, the print engine controlled by the controller;
    an apparatus having plural different light-emitting diodes (LEDs) and a sensor, the apparatus to activate the LEDs one at a time in an order, the apparatus to provide signals in accordance with photonic energy originating from each LED and reflected from a printed sheet of the media onto the sensor, the controller to control the print engine in accordance with the signals,
    in which the apparatus waits for a predetermined period of time to stabilize a signal before sampling from the sensor.

16. The method according to claim 11, in which waiting for a predetermined period of time to stabilize the signal before sampling from the sensor comprises sampling the signaling accurate within a tolerance.

17. The printing system of claim 15, further comprising a baffle wall separating the LEDs from the sensor.

18. The printing system of claim 15, in which the apparatus waiting for a predetermined period of time to stabilize the signal before sampling from the sensor further comprises waiting the predetermined period of time before activating a first one of the LEDs in the sequential order.

19. The printing system of claim 18, in which waiting for a predetermined period of time to stabilize the signal before sampling from the sensor comprises sampling the signaling accurate within a tolerance.

* * * * *